May 18, 1954     T. R. BLACK     2,678,718
ENDLESS HOOK CONVEYER
Filed June 16, 1951     2 Sheets-Sheet 1

INVENTOR.
THEODORE R. BLACK
BY
HIS ATTORNEY

May 18, 1954 T. R. BLACK 2,678,718
ENDLESS HOOK CONVEYER
Filed June 16, 1951 2 Sheets-Sheet 2
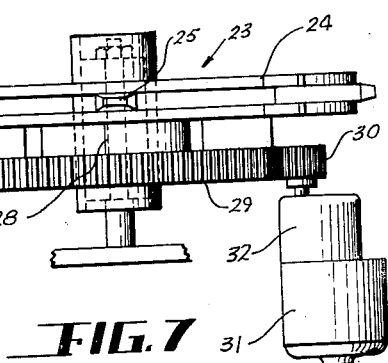
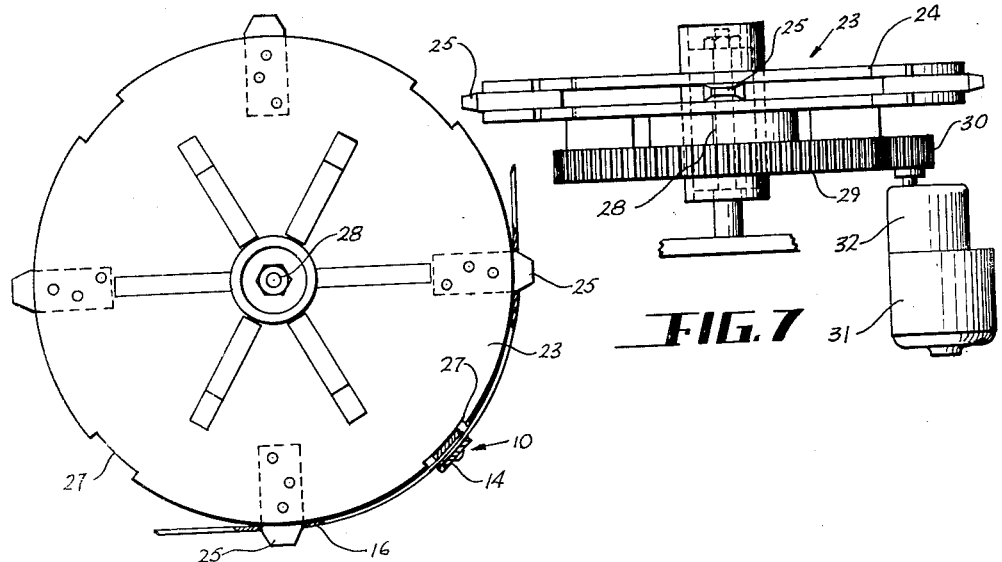
FIG. 6  FIG. 7
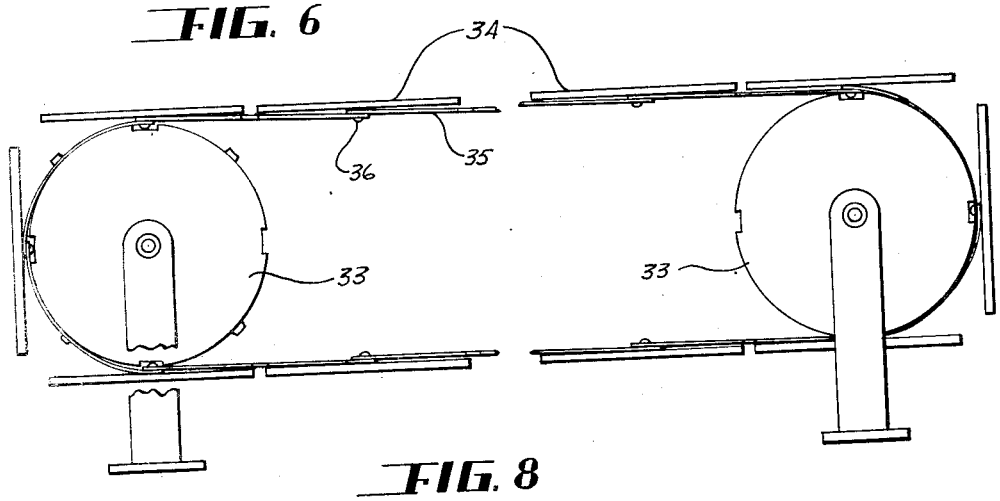
FIG. 8
INVENTOR.
THEODORE R. BLACK
BY
HIS ATTORNEY Patented May 18, 1954

2,678,718

UNITED STATES PATENT OFFICE 2,678,718

ENDLESS HOOK CONVEYER

Theodore R. Black, Tipp City, Ohio

Application June 16, 1951, Serial No. 231,955

4 Claims. (Cl. 198—177)

This invention relates to an endless conveyor and more particularly to a conveyor in which a series of load supporting devices are connected one with the other by flexible connecting devices to form an endless conveyor unit.

In such a conveyor the flexible connecting devices are subject to elongation which increases the over-all length of the conveyor unit and adversely affects the operation of the conveyor. For example in an overhead monorail conveyor the load supporting devices are usually in the nature of hangers which are movably supported on an endless track and are connected one with the other by a section of a chain or wire cable. The frictional contact between adjacent links of a chain section, under load, results in wearing away the contacting surfaces of the links, and the movable connections between the ends of the chain sections and the hangers are subject to similar wear. Wire cable will stretch under load. This wear or stretching increases the length of the connecting devices and while the elongation of each connecting device may be small the combined elongations of the several devices is such as to materially increase the length of the conveyor unit and to eventually render the same useless.

The main object of the invention is to provide a connecting device for such conveyor which will not be elongated by long use.

A further object of the invention is to provide such a connecting device comprising the narrow section of non-stretchable, flexible material. A further object of the invention is to provide such a connecting device which can be produced, installed and maintained at a low cost.

A further object of the invention is to provide such a connecting device comprising a strip of thin, flexible metal connected with the adjacent load supporting devices by wear resisting bearings.

Other objects of the invention may appear as the device is described in detail.

Figures 1, 2:
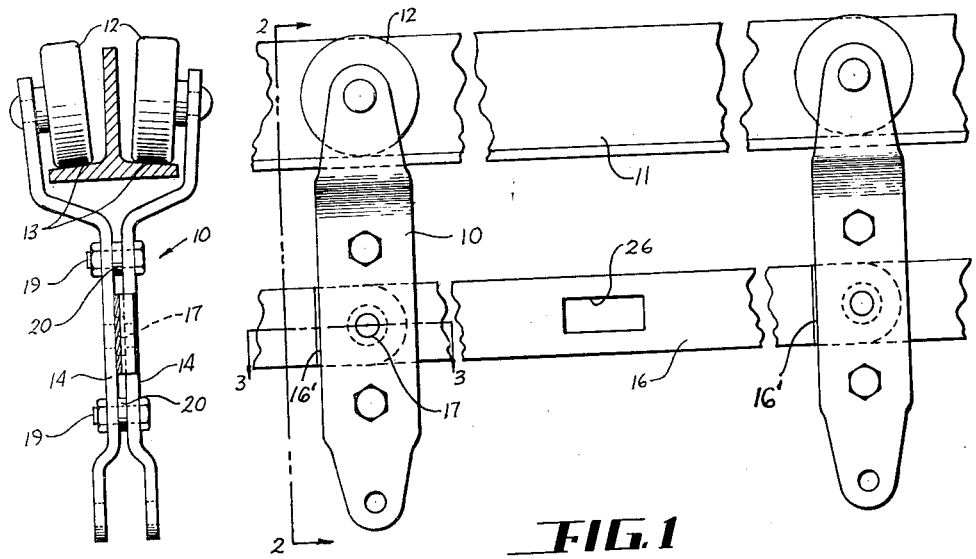
Figure 3:
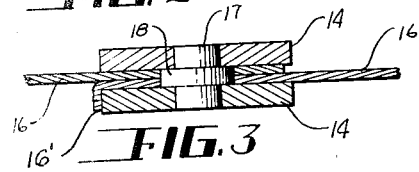
Figure 4:
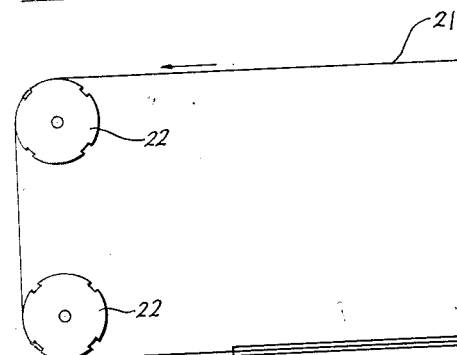
Figure 5:
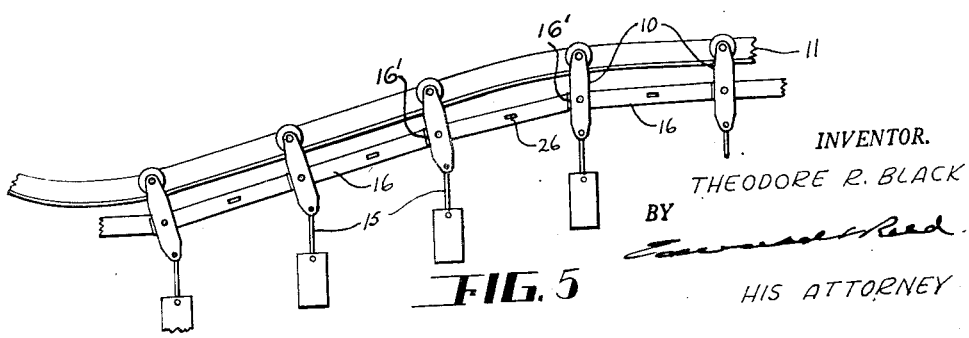

In the accompanying drawings, Fig. 1 is a side elevation, partly broken away, of a portion of a conveyor embodying the invention; Fig. 2 is a section taken on the line 2—2 on Fig. 1; Fig. 3 is a section taken on the line 3—3 on Fig. 1; Fig. 4 is a diagrammatical illustration of one form of conveyor to which the invention may be applied; Fig. 5 is a side elevation of a portion of a conveyor having an inclined portion; Fig. 6 is a side elevation of a propelling device; Fig. 7 is a top plan view of the propelling device and the driving motor; and Fig. 8 is a side elevation of a different type of conveyor to which the invention may be applied.

Each of the conveyors shown in the drawings is of a known type and comprises an endless series of load-supporting devices connected one with the other by flexible connections and adapted to move about rotatable guides, such as pulleys, at least one of which is power driven and has means for propelling the conveyor in an endless path.

In the form illustrated in Figs. 1 to 7 the load-supporting devices are in the form of hangers 10, suspended from and movable on an endless track 11. The track may be of any suitable form and is here shown as a monorail track in the form of an inverted T-rail, and each hanger has two rollers 12 supported on the respective flanges 13 of the T-rail. Preferably, each hanger comprises two elongate members 14 rigidly connected one with the other, the upper end portions of the members being spaced apart to receive between them the track engaging rollers 12 which are rotatably mounted on the respective end portions of the two members. The lower end of the hanger is adapted for connection with a load engaging element 15 (Fig. 5) and in the present instance the lower end portions of the two members are spaced apart to receive such an element between them.

Each hanger is connected with the adjacent hangers on the respective sides thereof by thin, relatively narrow bars 16, of strong, flexible and non-stretchable material, such as steel. In the construction here illustrated, each such connector consists of a bar or strip of high-carbon steel which has been heat treated to further harden the same. The strips may be of any desired size and in the form shown each strip is approximately $\frac{1}{16}$ of an inch in thickness and 1 and $\frac{1}{4}$ inches in width. The several bars are of a uniform length determined by the spacing of the hangers. The bars may be attached to the hangers in any suitable manner, but preferably the ends of each bar extend between and are secured to the two members of the respective hangers and the end portions of the two bars for each hanger overlap between said members and are connected one to the other and to the hanger by a pivot pin 17 extending through the two members of the hanger and the overlapping portions of the two bars. In the form shown the pivot pin is provided between its ends with a portion 18 of increased diameter which extends between the two members of the hanger. The adjacent ends of the two bars 16 are provided with openings of a diameter closely approximating the diameter of the enlarged portion 18 of the pivot pin, so as to have snug running contact therewith. The two members 14 of the hanger are spaced one from the other a distance slightly exceeding the combined thickness of the overlapping ends of the two bars, the spacing being such that the hanger and bars may have relative movement about the axis of the pivot pin but will be held in snug running contact one with the other. The two members of the hanger are, in the present instance, rigidly connected one with the other by bolts 19 and the intermediate portions thereof are spaced apart by suitable spacers, such as washers 20, arranged between said members above and below the pivot pin. Thus both bars are pivotally connected with the hanger so as to permit the pivotal movement of the hanger with relation to at least one of the bars when the hanger moves over an inclined portion of the track, as shown in Fig. 5, thereby enabling the hangers to remain in vertical positions when they are traveling over the inclined portions as well as when they are traveling on the horizontal portions of the track. Preferably one end of the one of the connecting members 16 for each hanger is bent laterally as shown in 16' and has flat engagement with the rear edge of the adjacent member of the hanger, so as to positively retain the hanger and the leading connecting member against relative pivotal movement.

The conveyor unit may travel in any suitable path, and as shown in Fig. 4 the endless unit 21 extends about four guides 22 and 23, which are here shown at the respective corners of a rectangular figure. The three guides 22 are in the nature of pulleys having supporting engagement with the unit and the guide 23 constitutes a driving or propelling device as well as a guide. It includes a sprocket wheel 24, the teeth 25 of which enter openings 26 in respective connecting members 16.

Preferably each connecting strip is provided with a single opening 26 and the teeth of the sprocket wheel are spaced apart such a distance that adjacent teeth will enter the openings in adjacent connecting strips. The periphery of the sprocket wheel is provided between adjacent teeth with a shallow recess 27 to receive one member of each hanger as it passes about the sprocket wheel, and the guides 22 may also be provided with such recesses. The sprocket wheel may be supported and driven in any suitable manner. As here shown, it is mounted on a shaft 28 supported in a suitable bearing and having connected therewith a gear 29 which is driven by a pinion 30 which is connected with an electric motor 31 through speed reducing gearing 32. Thus the motor driven sprocket wheel exerts a continuous pull on the conveyor unit and that pull is transmitted through the successive connecting devices to the several hangers, so that each connecting device pulls the several hangers in the rear of the same which have passed the sprocket wheel. In a relatively long conveyor, or a heavily loaded one, the load thus imposed upon the several connecting devices is very substantial and the wear on, or the stretching of the connecting devices is correspondingly great. However, applicant's one-piece connecting device is not stretchable by even a very heavy load, and the pivotal connections between the same and the respective hangers are not subjected to appreciable wear. As above stated, the connecting strips are of high-carbon steel and are heat treated to impart thereto additional hardness and the pivot pins are similarly treated so that even under heavy load the wear on the pivot pins and the strips is negligible. Consequently, even long continued use under heavy load will not cause wear or stretching sufficient to elongate the conveyor.

In Fig. 8 there is shown a different embodiment of the invention in which the conveyor is supported on drums or pulleys 33 which move about horizontal axes, one or both of which may be driving members. The load supporting members are in the nature of transverse pallets or load receptacles which are substantially horizontal on the upper stretch of the conveyor, as shown in 34. These load supporting members are connected by hardened, non-stretchable strips of steel, or other suitable material, as shown at 35. The overlapping ends of the adjacent strips are connected with one of the load supporting devices or pallets by a bolt or rivet 36, the connection being approximately midway between the front and rear edges of the load supporting element. Thus when in a horizontal position the front and rear portions of each element engage both the connecting members, and as the conveyor moves about the pulleys the connecting members or strips move in contact with the pulleys and the load supporting elements move about the pulleys in tangential relation thereto. In this type of conveyor each connecting member pulls the trailing load supporting elements and in the usual construction each connecting member is subject to wear in much the same manner as the connecting members of that type of conveyor first described, but the connecting devices herein described prevent any appreciable elongation of said connecting members.

While I have shown and described one embodiment of my invention I wish it to be understood that I do not desire to be limited to the details thereof as various modifications may occur to a person skilled in the art.

Having now fully described my invention what I claim as new and desire to protect by Letters Patent is:

1. An endless conveyor comprising a series of load supporting devices spaced apart lengthwise of said conveyor, and devices connecting adjacent supporting devices one with the other, each connecting device comprising an elongate strip of hard, flexible and non-stretchable material, and means for pivotally connecting the end portion of one of said strips with one of said supporting devices and for connecting a second strip with said supporting device and preventing the movement thereof with relation to said supporting device.

2. A conveyor comprising a series of elongate hangers having means whereby they are movably supported on a track in spaced relation one to the other, each hanger having laterally spaced parts, relatively narrow, flexible metallic bars supported between successive hangers, the end portions of the bars on opposite sides of each hanger extending into the space between said parts of said hanger in overlapping relation one to the other, a pivot pin connecting said end portions of said bars with said hanger, and means for preventing the movement of one of said bars about said pivot pin.

3. A conveyor comprising a series of elongate hangers having means whereby they may be movably supported on a track in spaced relation one to the other, each comprising substantially parallel members, means for connecting said members one with the other in laterally spaced relation, a pin mounted in said members and having an enlarged portion between said members, and series of relatively narrow, flexible metal bars arranged between adjacent hangers, the end portions of each bar extending into the spaces between the members of said adjacent hangers and having openings through which the enlarged portion of said pins extend, the enlarged portion of the pin of each of said hangers having supporting engagement with the bars on both sides of said hanger.

4. In an endless conveyor comprising supporting and propelling elements rotatable about parallel axes, a series of load supporting members and a series of thin, flexible metallic members connecting said load supporting elements one with the other, and means for connecting the end portions of each connecting member with intermediate portions of two adjacent load supporting elements, said means including a pivot pin for connecting said end portions to said load supporting elements, and means for preventing the movement of one of said flexible members about said pivot pin.

References Cited in the file of this patent

UNITED STATES PATENTS

| Number | Name | Date |
|---|---|---|
| 141,713 | Heughes | Aug. 12, 1873 |
| 727,591 | Cook | May 12, 1903 |
| 1,810,416 | Francis | June 16, 1931 |
| 1,907,894 | Stevens et al. | May 9, 1933 |